(12) United States Patent
Selleck

(10) Patent No.: US 10,977,386 B2
(45) Date of Patent: Apr. 13, 2021

(54) METHOD AND APPARATUS FOR DISCONNECTION OF USER ACTIONS AND USER IDENTITY

(71) Applicant: Voice.Vote SPC, Bellevue, WA (US)

(72) Inventor: Mark Selleck, Bellevue, WA (US)

(73) Assignee: VOICE.VOTE SPC, Bellevue, WA (US)

( * ) Notice: Subject to any disclaimer, the term of this patent is extended or adjusted under 35 U.S.C. 154(b) by 138 days.

(21) Appl. No.: 16/112,252

(22) Filed: Aug. 24, 2018

(65) Prior Publication Data

US 2019/0065782 A1   Feb. 28, 2019

Related U.S. Application Data

(60) Provisional application No. 62/549,456, filed on Aug. 24, 2017.

(51) Int. Cl.
*G06F 21/00* (2013.01)
*G06F 21/62* (2013.01)
*G06F 21/60* (2013.01)

(52) U.S. Cl.
CPC ........ *G06F 21/6254* (2013.01); *G06F 21/602* (2013.01)

(58) Field of Classification Search
CPC ........... G06Q 30/0255; G06Q 30/0269; G06Q 30/0277; G06Q 10/00; G06Q 40/08; G06F 21/6254; G06F 21/602
See application file for complete search history.

(56) References Cited

U.S. PATENT DOCUMENTS

| 6,873,688 | B1 | 3/2005 | Aarnio et al. |
| 9,754,318 | B1 | 9/2017 | Spies et al. |
| 2003/0046140 | A1 | 3/2003 | Callahan et al. |
| 2006/0064429 | A1 | 3/2006 | Yao |

(Continued)

FOREIGN PATENT DOCUMENTS

WO    2015006718 A1    1/2015

OTHER PUBLICATIONS

International Search Report and Written Opinion for International Application No. PCT/US18/47989 dated Sep. 20, 2019, 16 pages.

(Continued)

*Primary Examiner* — Ghazal B Shehni
(74) *Attorney, Agent, or Firm* — Moreno IP Law LLC

(57) ABSTRACT

In a communication network comprising a plurality of devices operatively connected to a communication network, a data manager operatively connected to the communication network receives information about a user from a first device, which information comprises user profile data including both personally identifiable information (PII) data and non-personally identifiable information (NPII) data, and user action data regarding actions the user has taken. Additionally, a private key is received from the first device. The user profile data is stored in a user profile data store, whereas user action data and NPII user profile data is stored in a user action data store based on the private key such that it is not linked to an identity of the user or any data in the user data profile store. In an embodiment, storage of the data in the user action data store is based on a one-way transformation of the private key.

28 Claims, 5 Drawing Sheets

510

| NAME | EMAIL | PHONE | ADDRESS | V? | DOB | V? | GENDER | POLITICAL AFFILIAT. | ETHNIC. | IDENTITY V? |
|---|---|---|---|---|---|---|---|---|---|---|
| Ann Able | aa@abc.com | 1112223333 | 123 Main, Town, IL 60001 | Y | 1-Apr-45 | N | Female | Democrat | Mexican | Y |
| Bob Baker | bb@xyz.com | 9998887777 | 786 Elm, City, FL 12345 | N | 1-Jan-80 | Y | Male | Democrat | -- | N |

502

512

520

| DATA ACCESS KEY | AGE RANGE | V? | GENDER | POLITICAL AFFILIAT. | ETHNIC. | RELIGION | POSTAL CODE | V? | STATE REP. DIST. | IDENTITY V? | Impeach Trump? | Ban Plastic Bags? |
|---|---|---|---|---|---|---|---|---|---|---|---|---|
| <bb> | 30-40 | Y | Male | Democrat | -- | Catholic | 12345 | Y | 8 | Y | Y | Y |
| <aa> | 70-80 | N | Female | Democrat | Mexican | Jewish | 60001 | N | 10 | N | Y | N |

504

(56) References Cited

U.S. PATENT DOCUMENTS

| | | |
|---|---|---|
| 2010/0088156 A1 | 4/2010 | Wilson |
| 2012/0246580 A1 | 9/2012 | Bouverat |
| 2013/0339091 A1 | 12/2013 | Humay |
| 2016/0127289 A1* | 5/2016 | Papa ..................... H04L 51/12 |
| | | 709/206 |
| 2017/0116627 A1 | 4/2017 | Fedosseev et al. |
| 2017/0140374 A1 | 5/2017 | O'Brien et al. |
| 2017/0237717 A1* | 8/2017 | Starosielsky ....... H04L 63/0435 |
| | | 713/176 |

OTHER PUBLICATIONS

International Search Report and Written Opinion for International Application No. PCT/US18/47982 dated Nov. 6, 2018, 8 pages.
Supplementary European Search Report for European Pat. App. No. 18901936 dated Feb. 24, 2021, 9 pages.

* cited by examiner

METHOD AND APPARATUS FOR DISCONNECTION OF USER ACTIONS AND USER IDENTITY

CROSS-REFERENCE TO RELATED APPLICATION

The instant application claims the benefit of co-pending Provisional U.S. Patent Application Ser. No. 62/549,456 entitled "AUTHENTIC PRIVACY: PROVIDING VALID RESULTS WITHOUT COMPROMISING USER PRIVACY" and filed Aug. 24, 2017, the teachings of which are incorporated herein by this reference.

The instant application is also related to co-pending U.S. patent application entitled "METHOD AND APPARATUS FOR OBTAINING RESPONSES FROM USERS VIA COMMUNICATION SYSTEM" having 16/112,267, filed on even date herewith.

FIELD

The instant disclosure relates generally to systems that maintain data about users and, in particular, to techniques for maintaining data about users while also ensuring privacy of such users.

BACKGROUND

The proliferation of the Internet and World Wide Web has ushered in an unprecedented level of communication between entities (i.e., people, businesses, organizations, etc.) as well as the unprecedented ability to collect data about such entities, knowingly and unknowingly. For example, the routine digital collection of personal data has grown exponentially in the past decade, arguably destroying any semblance of privacy. Every user action (click, comment, search, post, tweet, location, like, photo view, listen, etc.) is meticulously tracked, often without user awareness or control. More recently, an increase in public awareness about the level of data collection and the amount that such data is shared with others has raised persistent and troubling concerns about individual privacy.

Nevertheless, individuals are willing to provide personally identifiable information for legitimate purposes facilitated by Internet and World Wide Web technologies. For example, e-commerce companies need to verify user billing and shipping address to reduce fraud, and need verified email addresses to send receipts and shipping notices. As another example, responsible elected officials want to understand public opinion from those they particularly represent, and the relevant constituents within their jurisdictions are often willing to provide email addresses for this purpose.

Simultaneously, Internet and World Wide Web technologies may also provide the opportunity for anonymous communications, thereby maintaining privacy to a greater degree. In short, in the domain of Internet- or World Wide Web-based, electronically-implemented data collection, tensions exist between the respective benefits of known identities and anonymity.

When their identity is known, individuals are less likely to exhibit bad behaviors such as fraud, harassment and abuse. However, this may come at a cost as known users often engage in a form of self-censorship whereby they present a sanitized and flattering view of themselves, including providing socially desirable (and often inaccurate) commentary or responses to surveys. Further, a known identity allows institutions to relentlessly track users online and offline as noted above, and inhibits individual rights including the right to privacy and the right to free speech. Many people—often including public figures, women and minorities—refrain from expressing their opinions online (including not responding to polls) to avoid harassment, confrontation, embarrassment or alienating others. Asking respondents to provide personally identifiable information decreases already-low response rates, just as verifying user identity lowers the response rate to online petitions.

On the other hand, anonymity allows people to freely exercise their right to free speech without repercussion, but also allows anonymous trolls to harass and abuse others, producing an uncivil tone of griping, distrust, and disgust. As a result, many online publishers including Reuters, National Public Radio, The Chicago Sun Times and Popular Science no longer allow readers to comment on articles, which suppresses free speech and the open expression of ideas that is critical to democracy. Anonymity also makes it extremely difficult to accurately measure or understand public opinion, since anyone can respond multiple times using fake user profiles. Even when respondents are asked to provide personally identifiable information (PII), they can often remain anonymous by using fake names (pseudonyms). For example, online petitions by the White House, Change.org, Moveon.org and other organizations are essentially worthless because anyone can respond (multiple times) with any fake name, address etc. they choose.

Thus, it would be advantageous to accurately record and tally the online and offline behavior, beliefs, knowledge and other actions and attributes of a population of known and potentially verified users, thereby utilizing the efficiencies and scope of Internet- or World Wide Web-based technologies, while simultaneously maintaining privacy.

SUMMARY

The instant disclosure describes techniques for ensuring, in a communication network comprising a plurality of devices operatively connected to a communication network, that user action data and non-personally identifiable information about a user, as captured in a data store, cannot be connected to personally identifiable information about a user. In an embodiment, a data manager operatively connected to the communication network, receives information about a user from a first device of the plurality of devices via the communication network, which information comprises user profile information including both personally identifiable information (PII), such as name and address, and non-personally identifiable information (NPII), such as gender, ethnicity and religious affiliation; and user action data (NPII) about the user, such as their response to a query, having registered to vote, or having identified as a Hispanic female. Additionally, a private key is received from the first device via the communication network. The user profile data is stored in a user profile data store, whereas the user action data and NPII user profile data about the user is stored in a user action data store based on the private key such that it is not linked to an identity of the user or any user data in the user profile data store. In an embodiment, a historical record of all changes made to the user profile data store and the user action data store is maintained.

At least a portion of the PII user profile data can be transformed to provide new NPII user profile data, which new NPII user profile data is subsequently stored in the user action data store in a similar manner. For example, home address (PII) can be transformed into political districts, postal code, city and state, which are all NPII. Furthermore, at least a portion of the data in the user profile data store and the user action data store is preferably authenticated. As used herein, terms like "valid," "authentic," "verified," etc. or variations thereof refer to the accuracy of user-provided data and to the determination of identity, i.e. that users are whom they represent themselves to be. In an embodiment, the user data profile store and the user data action store are separate from each other. Further still, portions, or all of, either data store may be local to one or more of the plurality of devices or may be implemented via a third-party data store.

In another embodiment, storage of data in the user action data store is accomplished by performing a first one-way transformation on the private key thereby providing a user action data store access key, knowledge of which is insufficient to derive the private key. In turn, the user action data store access key is used to update the user action data store. In this manner, data in the user action data store is not linked to the user's identity, as the one-way transformation, as noted, prevents reversal of the user action data store access key into data that could be used to identify the user. Similarly, a second one-way transformation of the private key (different from the first one-way transformation) can be optionally used to transform the private key to provide a user profile data store access key used to store the user profile data in the user profile data store. In some embodiments, it may be desirable to prevent modification of a user's action, as stored in the user action data store based on the private key, even when a device properly presents the private key. In these cases, it may be further desirable, following occurrence of an event, to permit devices presenting the private key to modify a user's action in the user action data store.

In yet another embodiment, variable options for viewing reports based on the user action data store are provided to the first device via the communication network. Each of the variable options corresponds to a type of data in the user action data store, such as specific data elements concerning user demographics. In turn, the first device provides an indication of a selected variable option and it is determined whether the user's data stored in the user action data store includes a value for the type of data corresponding to the selected variable option. When the user's data does include such a value, a report according to the selected variable option (i.e., the type of data in the user action data store) is provided to the first device via the communication network. On the other hand, when the user's data does not include such a value, then a request to provide a value for the type of data corresponding to the selected variable option is sent to the first device via the communication network. Thereafter, the requested value is received and stored in the user action data store according to the type of data corresponding to the selected variable option. Thereafter, the report according to the selected variable option is provided to the first device via the communication network.

In all embodiment described herein, only devices presenting the private key are permitted to modify (i.e., to update, add or delete) data stored in the user action data store based on that private key. On the other hand, a given device can submit a request for data from the user action data store. In response, the device may be presented no more than aggregated data from the user action data store or, optionally, with data for specific individuals (albeit, without any PII for such specific individuals).

BRIEF DESCRIPTION OF THE DRAWINGS

The features described in this disclosure are set forth with particularity in the appended claims. These features and attendant advantages will become apparent from consideration of the following detailed description, taken in conjunction with the accompanying drawings. One or more embodiments are now described, by way of example only, with reference to the accompanying drawings wherein like reference numerals represent like elements and in which:

DETAILED DESCRIPTION OF THE PRESENT EMBODIMENTS

Figure 1:
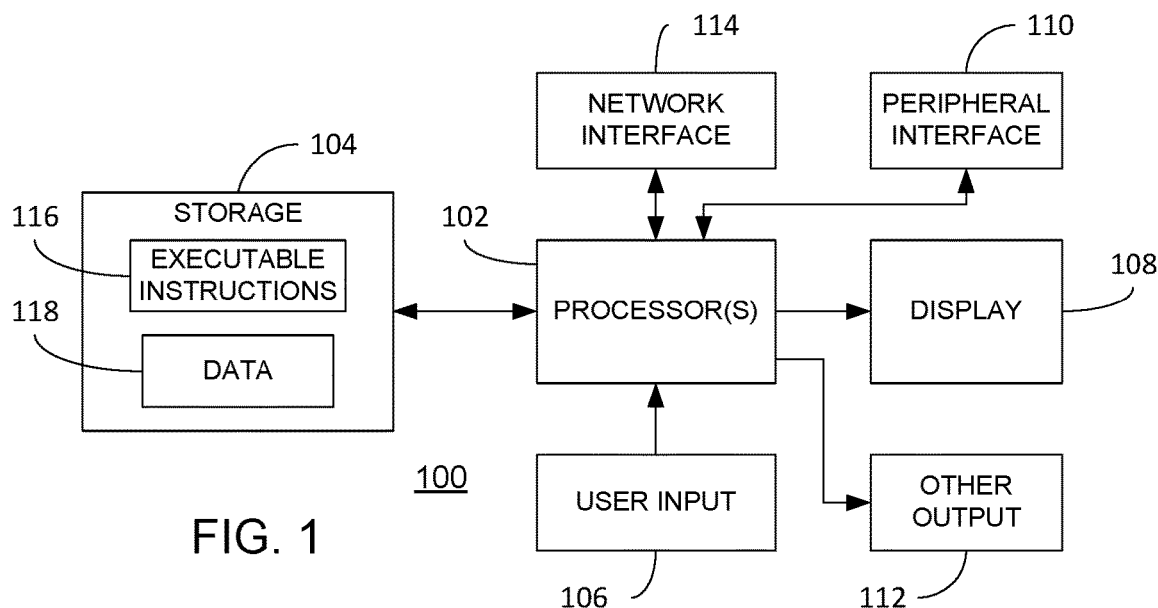
FIG. 1 is a block diagram of an example of a processing device that may be used to implement the teachings of the instant disclosure.

FIG. 1 illustrates a representative processing device 100 that may be used to implement the teachings of the instant disclosure. The processing device 100 may be used to implement, for example, one or more components of the system 200, as described in greater detail below. Regardless, the processing device 100 comprises a processor 102 coupled to a machine-readable storage component 104. The storage component 104, in turn, comprises stored executable instructions 116 and data 118. In an embodiment, the processor 102 may comprise one or more of a microprocessor, microcontroller, digital signal processor, co-processor or the like or combinations thereof capable of executing the stored instructions 116 and operating upon the stored data 118. Likewise, the storage component 104 may comprise one or more devices such as volatile or nonvolatile memory including but not limited to random access memory (RAM) or read only memory (ROM). Further still, the storage component 104 may be embodied in a variety of forms, such as a hard drive, optical disc drive, floppy disc drive, database and corresponding database management system (DBMS), etc. Processor and storage arrangements of the types illustrated in FIG. 1 are well known to those having ordinary skill in the art. In one embodiment, the processing techniques described herein are implemented as a combination of executable instructions and data within the storage component 104.

As shown, the device 100 may comprise one or more user input devices 106, a display 108, a peripheral interface 110, other output devices 112 and a network interface 114 in communication with the processor 102. Though the one or more user input devices 106, display 108, peripheral interface 110, other output devices 112 and the network interface 114 are illustrated as being separately connected to or in communication with the processor 102, those having skill in the art will appreciate that the illustrated connections can be implemented by one or more communication busses and, further, that such busses may permit communication between the various components 104-114. The user input device 106 may comprise any mechanism for providing user input (such as inputs specifying user profile data, user action data, private keys, requests, etc. as described below) to the processor 102. For example, the user input device 106 may comprise a keyboard, a mouse, a touch screen (as part of the display 108), microphone and suitable voice recognition application or any other means whereby a user of the device 100 may provide input data to the processor 102. The display 108, may comprise any conventional display mechanism such as a cathode ray tube (CRT), flat panel display, or any other display mechanism known to those having ordinary skill in the art. In an embodiment, the display 108, in conjunction with suitable stored instructions 116, may be used to implement a graphical user interface. Generally, implementation of a graphical user interface in this manner is well known to those having ordinary skill in the art. The peripheral interface 110 may include the hardware, firmware and/or software necessary for communication with various peripheral devices, such as media drives (e.g., magnetic disk or optical disk drives), other processing devices (scanners, barcode readers, etc.) or any other input source (including other, similar processing devices) used in connection with the instant techniques. Likewise, the other output device(s) 112 may optionally comprise similar media drive mechanisms, other processing devices or other output destinations capable of providing information to a user of the device 100, such as speakers, LEDs, tactile outputs, etc. Finally, the network interface 114 may comprise hardware, firmware and/or software that allows the processor 102 to communicate with other devices via wired or wireless networks, whether local or wide area, private or public, as known in the art. For example, such networks may include the World Wide Web or Internet, or private enterprise networks, as known in the art.

While the device 100 has been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the device 100 may include a greater or lesser number of components than those illustrated. Once again, those of ordinary skill in the art will appreciate the wide number of variations that may be used is this manner. Further still, although a single processing device 100 is illustrated in FIG. 1, it is understood that a combination of such processing devices may be configured to operate in conjunction (for example, using known networking techniques) to implement the teachings of the instant disclosure.

Figure 2:
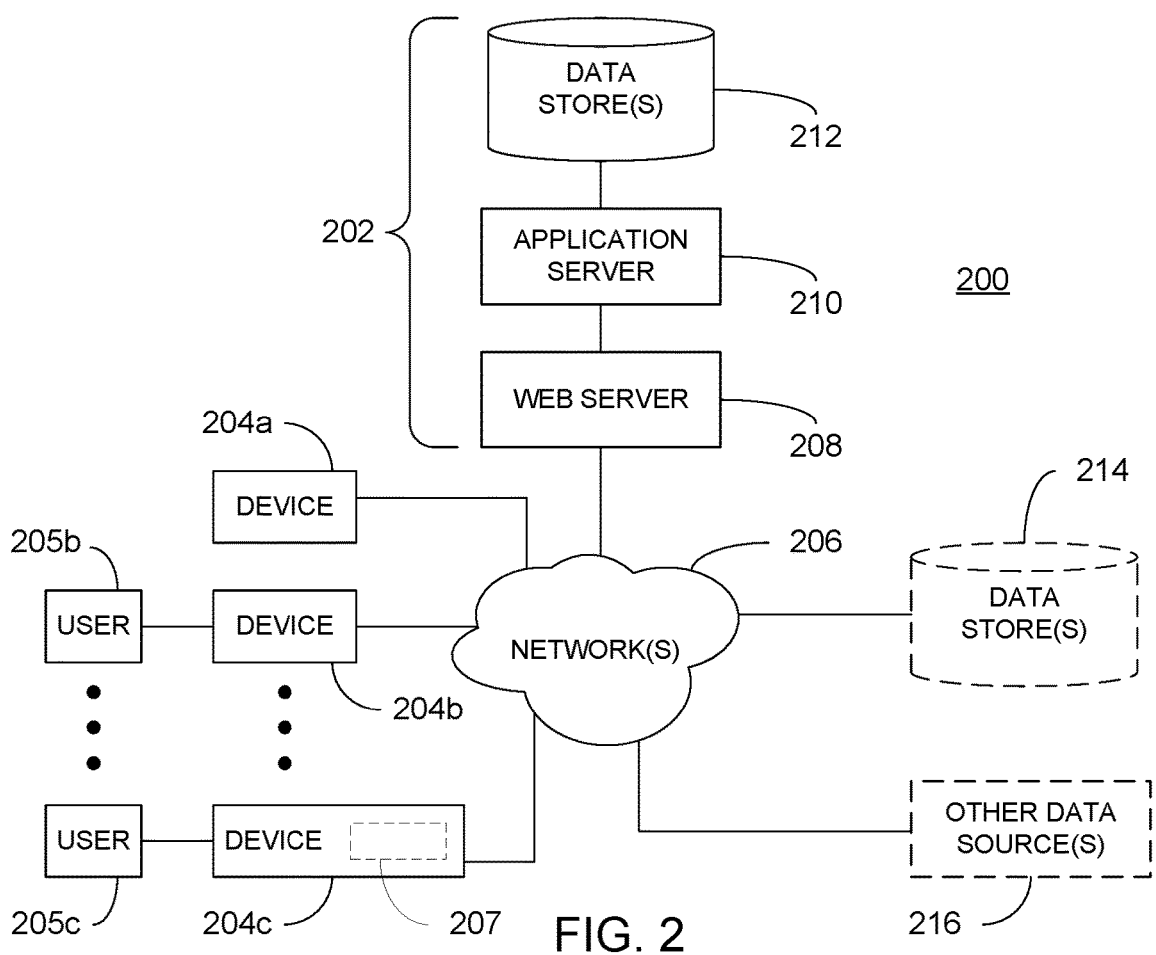
FIG. 2 is a block diagram of a communication system in accordance with the teachings of the instant disclosure.

Referring now to FIG. 2, a communication system 200 in accordance with the instant disclosure is shown. Specifically, the system 200 comprises a data manager 202 operatively connected to and in communication with a communication network 206. Additionally, a plurality of devices 204 are also operatively connected to and in communication with the communication network 206. As described in greater detail below, the data manager 202 may comprise one or more processing device (as described above relative to FIG. 1) in the form of server computers, database servers or other types of computing devices as known in the art, particularly in connection with, for example, the implementation of websites and/or data stores. In an embodiment, the devices 204b-c may comprise processing devices deployed for the use of individual users 205b-c, such as home-use desktop computers, laptop computers or the like. Alternatively, the devices 205b-c may comprise mobile computing devices such as tablet or handheld computers, mobile telephones and the like. Although one-to-one relationships between users 205b-c and devices 204b-c are illustrated in FIG. 2, this is not a requirement as an individual user may operate multiple devices or a single device may be used to support multiple users. Further still, the devices 204 may comprise processing devices that operate independently of a user, as in the case of a computer or the like capable of operating on behalf of one or more users. In an embodiment, such devices may communicate with the data manager 202 via a suitable application programming interface (API), as known in the art. The communication network 206 may comprise a public network (e.g., the Internet, World Wide Web, etc.) or private network (e.g., local area network (LAN), etc.) or combinations thereof (e.g., a virtual private network, LAN connected to the Internet, etc.). Furthermore, the communication network 206 need not be a wired network only, and may comprise wireless network elements, as known in the art, capable of communicating with wireless devices.

It is noted that instances of users 205 communicating with the data manager 202 and vice versa may be described below. Where this phrasing is employed, it is done so for ease of description and it is understood that users 205 communicate with the data manager 202 via corresponding devices 204.

In the illustrated embodiment, the data manager 202 may comprise a web server 208, an application server 210 and a data store 212. As known in the art, the web server 208 may comprise one or more processing devices and corresponding software used to serve content (e.g., respond to requests for content, receive data from connected devices, etc.) on the World Wide Web. Similarly, the application server 210 may comprise one or more computing devices and corresponding software used to implement functions that support the operation of the web server 208, including the various processing techniques described herein. The data store 212 may comprise, in an embodiment, one or more processing devices and suitable database management system (DBMS) used to implement the user profile data store and/or user action data store as described below. In operation, for example, the web server 208 communicates with the devices 204 via the communication network 206 and may provide an interface that permits devices 204 to provide data (such as user profile information, user actions, private keys, etc. as described below) that is then processed by the application server 210. In some instances, the application server 210 causes data to be stored in or retrieved from the data store 212, as further described below. Where data is to be provided back to one or more of the devices 204, the web server 208 obtains the necessary data from the application server 210 and communicates the data to the relevant devices 204.

In an embodiment, at least a portion of the data handled by the application server 210 may be stored in locations accessible by the data manager 202 only through the communication network 206. For example, one or more data stores 214, operated by a third-party data storage provider as known in the art, may be used for this purpose. Alternatively, a data store 207 may be provided in a given device 204c using the device's local machine readable storage component(s). As further shown in FIG. 2, data employed by the data manager 202 may be obtained from other data sources 216. As described below, such other data sources 216 may include the data stores of third-parties (similarly implemented as described above) having PII and NPII data about various ones of the users 205. In an embodiment, the other data sources 216 may communicate with the data manager via an API.

Figure 3:
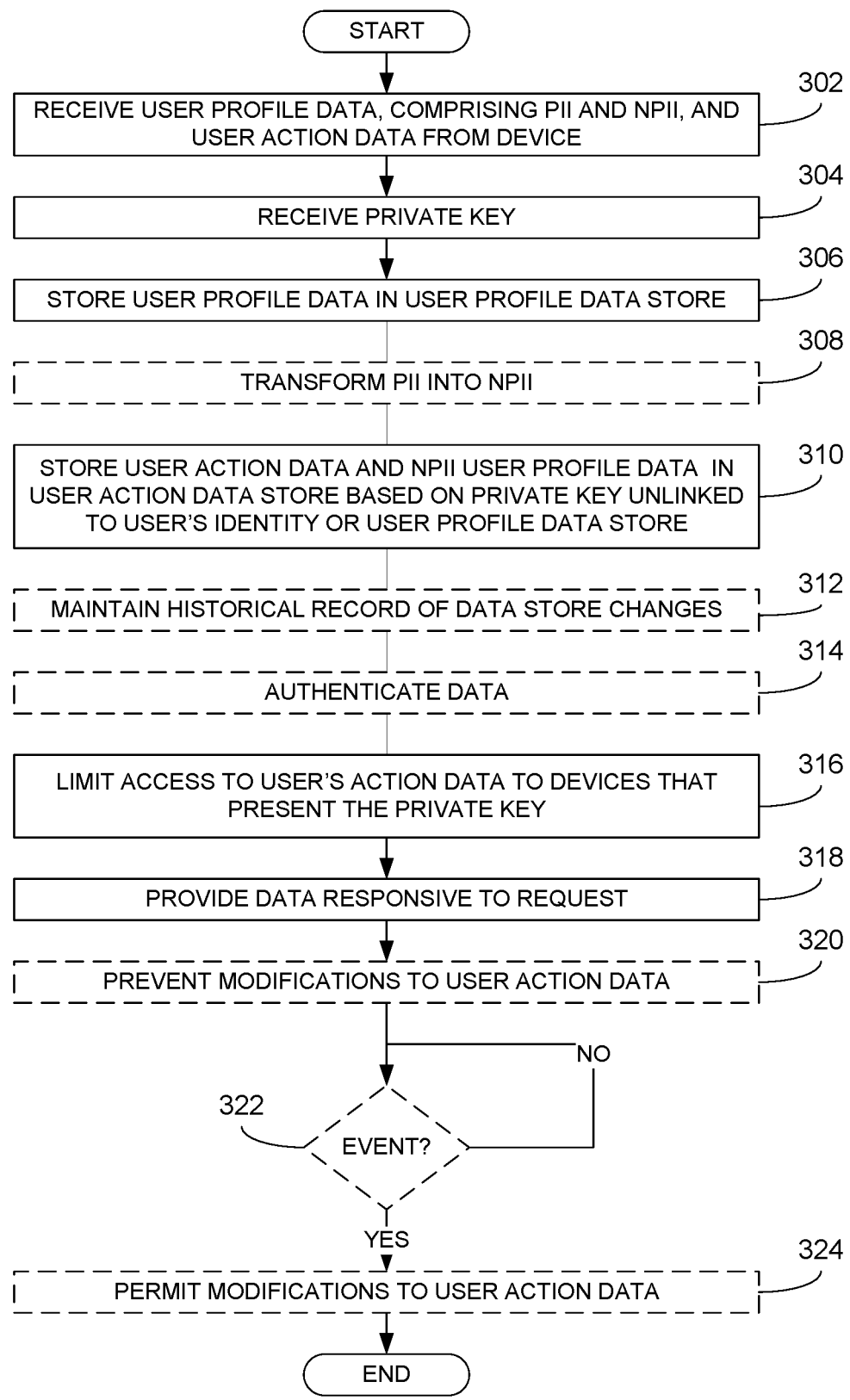
FIG. 3 is a flow chart illustrating processing in accordance with the teachings of the instant disclosure.

Referring now to FIG. 3, operation in accordance with an embodiment of the instant disclosure is illustrated. In particular, FIG. 3 illustrates operation of the data manager 202. Thus, at block 302, the data manager receives user profile data about a user from a first device of the plurality of devices. In an embodiment, the information includes PII and NPII. As used herein, PII includes any data that can be used to effectively identify a given user. Non-limiting examples of PII include a user's name, residential address, phone number, email address, etc. On the other hand, NPII includes any data that cannot be used on its own to identify a given user, though those having skill in the art will appreciate that NPII can, at times, be cross-referenced with other external data to identify a given user (sometimes referred to as "deanonymization" or "data re-identification"). Non-limiting examples of NPII include a user's age, telephone area code, postal code, residential city, residential county, residential state, etc. Additionally, as used herein, NPII includes data that may be derived from PII, such as an age range and political district. Further still, as used herein, NPII may include any detectable actions (or inactions) taken by a given user within and outside of the communication system. Non-limiting examples of such "action based" NPII include responding to an online survey, providing an online review, registering to vote, obtaining a college degree, scanning a bar code, reacting to a social media post (e.g., a Facebook "like"), submitting a query to a search engine, navigating in a browser to a particular website or address, etc. As will be appreciated by those of skill in the art, techniques for ascertaining such actions are well known. In one embodiment, though not illustrated in FIG. 3, the data manager (or other entity) causes a stimulus (such as a survey, hyperlink, etc.) to be provided to the plurality of devices, thereby soliciting the information about the user received at block 302. Given the nature of PII and NPII, the techniques described herein are designed to ensure that NPII information about a user, as stored in a user action data store, cannot be linked to the user's identity or PII.

The processing illustrated in FIG. 3 proceeds to block 304 where the data manager receives a private key from the first device. It is noted that, while FIG. 3 illustrates an ordering between the receipt of the user profile data and user action data and the receipt of the private key, this is not a requirement. (Indeed, except to the extent expressly stated or necessarily implied herein, the ordering illustrated in FIG. 3 is not a requirement for any of the steps.) As used herein, a private key is one or more pieces of data maintained in secret by a given user (and/or the user's one or more devices). An aspect of the instant disclosure is that only devices presenting a given private key are able to access or modify (change, add or delete) data associated with that private key (though the data manager can always read the entire data store). Consequently, the private key must be maintained in secret to ensure some privacy protections provided by the instant disclosure and, likewise, loss of the private key (assuming no backup private keys, as known in the art) will prevent any device (except the data manager) from accessing or modifying the corresponding data.

Thereafter, at block 306, the data manager stores the user profile data in a user profile data store. Techniques for storing user profile data in accordance with the instant disclosure are described further with reference to FIGS. 4 and 5 below. Optionally, at block 308, the data manager can transform at least a portion of PII data into NPII data. Those skilled in the art will appreciate that various techniques for implementing such transformations are well known in the art. For example, in the case of a given user's date of birth, such a transformation may result in the creation of an age range, i.e., the fact that a person was born on Jul. 20, 1955 can be used to derive the corresponding NPII age range, such as "50 to 70 years." As another example, a user's residential address in the United States can be used to derive which federal, state and local political districts the user resides in.

Regardless, processing continues at block 310 where data (whether user action data received at block 302 or derived at block 308) is stored in a user action data store based on the private key and in such a manner that it is unlinked to the user's identity or any data in the user profile data store. A presently preferred embodiment of the storage performed at blocks 308 and 312 is further illustrated below with reference to FIGS. 4 and 5.

Figure 4:
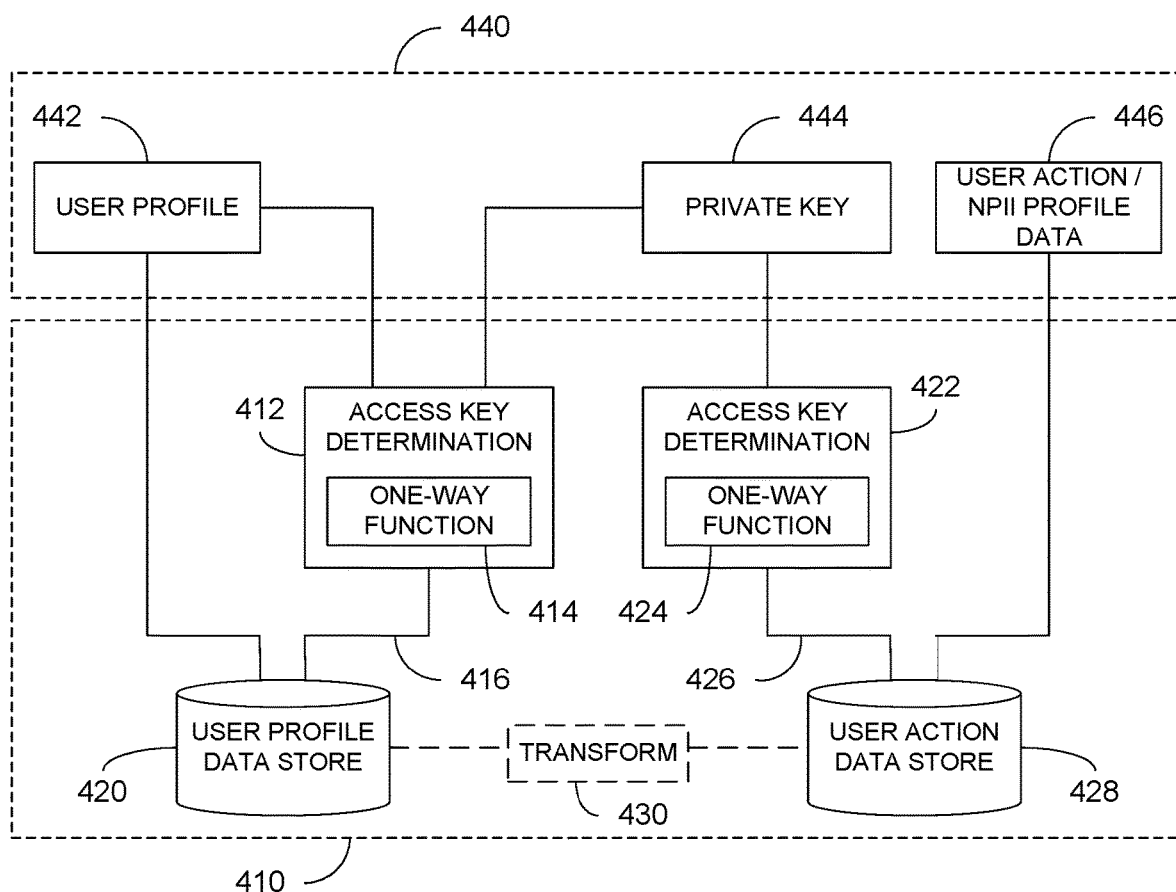
FIG. 4 is a schematic block diagram illustrating data flow of user profile data and user action data in accordance with the teachings of the instant disclosure.

In particular, FIG. 4 is a schematic block diagram illustrating data flows and processing that may be used to store user profile data and user action data. In particular, FIG. 4 illustrates a data manager 410 in communication with a device 440 as described above relative to FIG. 3. That is, the device 440 provides user profile data 442, user actions and NPII user profile data 446 and a private key 444 to the data manager 410.

In a presently preferred embodiment, the private key 444 is provided to first access key determination processing 422. In the preferred embodiment, such processing 422 involves passing the private key through a first one-way function or transformation and any additional processing to generate a user action data store access key 426. The one-way function transforms the private key 444 into a unique value (no two inputs to the one-way transformation result in the same output) such that knowledge of the output of the function is insufficient to allow reconstruction of the private key. For example, various cryptographic hash functions, such as the so-called SHA-256, SHA-512 or BLAKE2 algorithms, may be employed for this purpose. Further techniques for improving the security of such hash functions, such as adding a "salt" to the private key prior to the one-way transformation, are well known to those skilled in the art and may be incorporated into any implementation of the instant techniques. As used herein, the user action data store access key 426 serves as an index into a user action data store 428 used to store the user action/NPII data. While it is possible to use the output of the first one-way transformation 424 for this purpose, in a preferred embodiment, a lookup table is employed in which the output of the one-way transformation is associated with one or more index values into corresponding data stores. It is noted that, though the user action data store 428 (likewise, the user profile data store 420) is illustrated as a single "device" in FIG. 4, it is understood that multiple physical devices could be used to implement the user action data store 428, which is essentially a logical (rather than physical) representation. For example, one type of NPII data could be stored in a first data base forming the user action data store 428 whereas another type of NPII data could be stored in a second data store also forming a part of the user action data store 428. Thus, the user action data store access key 426 may actually comprise one or more index values into one or more corresponding data bases. It will be appreciated that, because only information regarding access keys 416, 426 is maintained by the data manager, and not the private keys themselves, illicit access to the data manager or NPII data in the user action data store will not result in connection of a given user to his/her NPII. Likewise, knowledge of a given user's identity is not sufficient to tie that user's identity to the data stored in the user action data store.

One particular possibility in which PII and NPII could overlap within the user action data store bears mentioning. In particular, users may be prompted to enter free-form text in response to a query. This introduces the possibility that they reveal PII, such as their email address, in the free-form text. If free-form text fields were added to the user action data store, users could compromise their privacy, since any PII would be linked to all of the user's data in the user action data store. Therefore, to ensure user privacy, free-form text fields may be stored in a separate data store (not shown) that is unique to the query that elicited the free-form text. A key to this separate data store may be associated with the action request in order to link the query to all free-form text responses to that query. The key to this separate data store may be transformed using a one-way cryptographic hash functions as previously described, such that there is no link from the separate data store to the user action data store. In this way, any PII a user reveals in a free-form text field would not be associated with either the user action data store or the user profile data store.

Having thus determined the user action data store access key 426, the user's NPII data 446 may be added to a record in the user action data store that is located based on the one or more indexes embodied by the user action data store access key 426.

As shown, second access key determination processing 412, including a second one-way function or transformation 414, may be implemented by the data manager 410. When provided, the second one-way transformation 414 is different from the first one-way transformation 424 to the extent that the second transformation of the private key 444 will result in an output that is a non-identical to the output of the first transformation of the private key 444. For example, this may be accomplished through the user of different algorithms altogether or through other manipulation of the private key 444, e.g., the addition of different salts as between the first and second transformations 422, 412. Once again, the second transformation 414 (including any additional lookup table processing, for example, as described above) results in a user profile store access key 416 that is used to index the user profile data store 420 when storing the user profile data 442 received from the device. Although a process of transforming the private key 444 according to the second access key determination processing 412 has been described, it is appreciated that such a transformation of the private key 444 is not a requirement when storing the PII.

For completeness, a transformation process 430, as described above relative to block 310, is schematically illustrated in FIG. 4, it being understood, once again, that the user profile data store 420 and user action data store 428 are maintained separate from each other. Additionally, in an embodiment, it may be desirable to store such new NPII user profile data (as well as other NPII data) in the user profile data store 420 as well as the user action data store 428.

Figure 5:
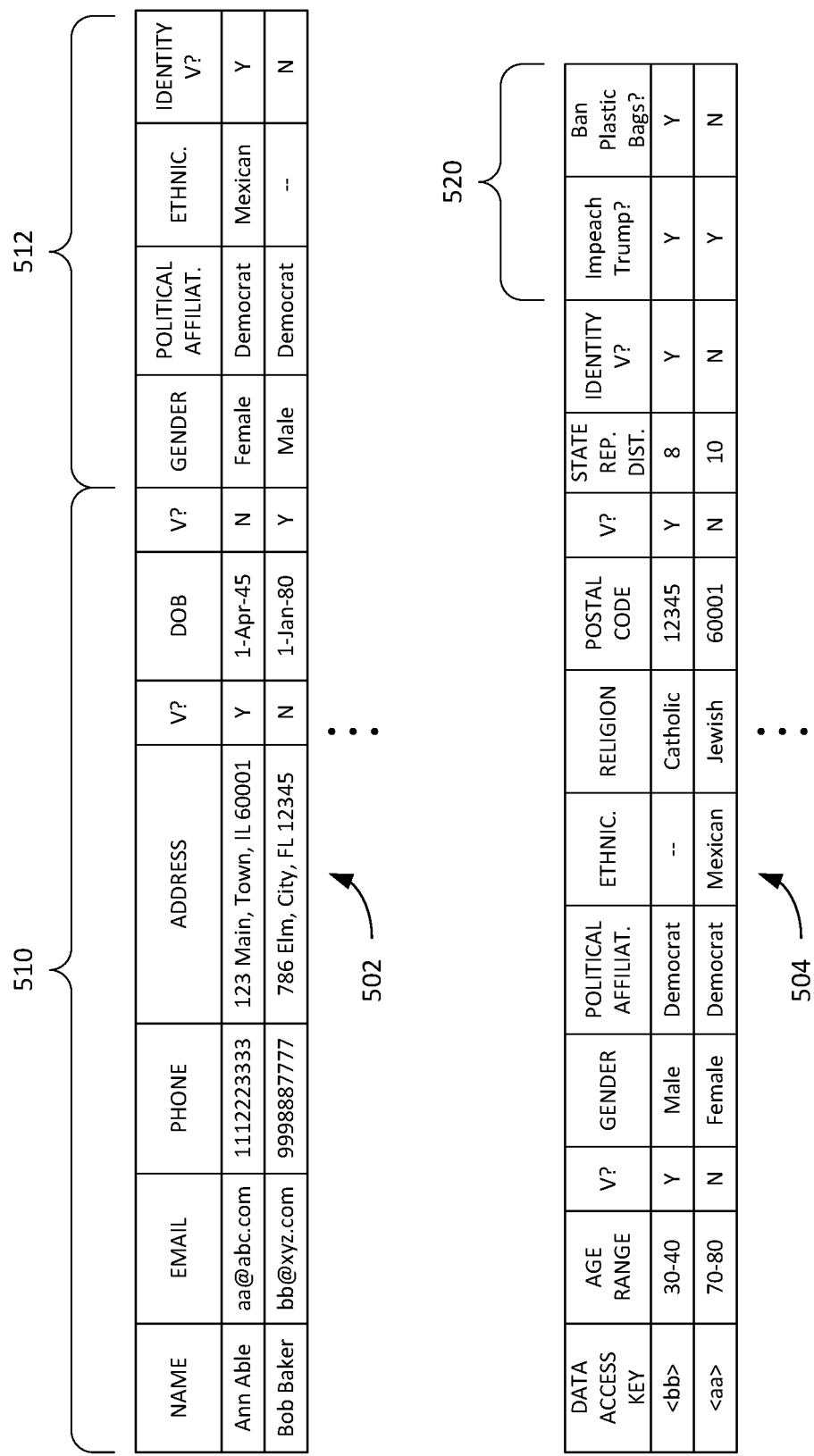
FIG. 5 is an illustration of PII and NPII user profile data as stored in a user profile data store, and NPII user profile data (such as demographics) and NPII user action data as stored in a user action data store, respectively.

Examples of data as stored in a user profile data store 420 and user action data store 428 are further illustrated with reference to FIG. 5. In particular, FIG. 5 illustrates logical representations of a user profile data store 502 and user action data store 504. In the illustrated example, the user profile data store 502 includes data for two users, Ann Able and Bob Baker, and includes both PII 510 and NPII 512. Examples of PII 510 include the name, email account, phone number, residential address, and date of birth of each user, whereas examples of NPII 512, in this case, include each user's gender, political affiliation and ethnicity. The fields labeled "V?" following certain data fields indicates whether the preceding data field for a given user has been verified or authenticated. Thus, in the illustrated example, the residential address for Ann Able has been authenticated whereas the residential address for Bob Baker has not. In a similar vein, an identity verification field can be provided indicating whether the identity of the user (as opposed to just specific data for that user) has been verified; in the illustrated example, the identify of only Ann Able has been authenticated.

In the illustrated example, the user action data store 504 includes data for two users who are identified solely by their corresponding user action data base access keys, illustrated as <aa> and <bb> in FIG. 5, to emphasize the fact that the access keys, being based on a one-way transformation of information that cannot be used to identify the actual user, do not link data in the user action data store to any user's identity or to any PII stored in the user profile data store 502. In the illustrated example, various types of NPII user profile data are illustrated including an age range, gender, political affiliation, ethnicity, religion, postal code, and state representative district. Once again, authentication status indicators for individual data fields and/or the user's identity are also provided. As further illustrated, data fields 520 are provided indicating various user actions, as defined above. In the illustrated examples, such actions include responding to two survey queries, e.g., "Should Trump be impeached?" and "Should plastic bags be banned?" In these instances, the values associated with each action are simple "yes" or "no" indications. However, it is appreciated that values associated with other user actions will necessarily be dictated by the nature of the action taken by the user, e.g., the value to a query concerning a given user's income range will be in the form of a range of numbers.

It is not a requirement that all fields for a given user include a value. For example, as shown, an ethnicity for Bob Baker is not provided. As described below, a technique is provided that allows the data manager to obtain such data from a given user. Additionally, it is noted that the potential fields for both user profile and user actions are not limited to the examples shown. In fact, it is anticipated that such fields can be added in an essentially unlimited fashion by virtue of new actions being taken by users and the data manager.

Referring once again to FIG. 3, further processing by the data manager is described. At block 312, the data manager may optionally maintain a historical record of all changes made to the data stores resulting from operations at blocks 306 and 310. Techniques for maintaining such historical records are well known to those having skill in the art. Furthermore, at block 314, the data manager can optionally authenticate some or all of the user data. Various techniques for performing such authentication or verification are well known in the art. For example, voter registration status can be verified by third party API services. Further still, home address may be verified by various techniques including AVS (Address Verification System) services from credit card processors, and identity verification services from credit bureaus, such as Experian's "PRECISE ID" service. As will be appreciated by those having skill in the art, various pieces of data have unique methods used to provide verification thereof, and the techniques described herein are not dependent upon the specific verification approach used, nor the point in time of collection or verification of such data. Where possible, data is verified independently and are only considered verified when confirmed by a trusted source. Verification may occur at a later point in time and can also occur over time. For example, a user may provide payment information at a later date, and credit card AVS may then be used to verify their home address.

Continuing with FIG. 3, block 316 illustrates processing implemented by the data manager in which access to any given user's data in the user action data store is limited to those devices that are capable of providing that user's private key (aside from the data manager, which always has access to the data in the user action data store) for the reasons noted above. Similarly, at shown at block 318, the data manager, in response to a request for data from the first user device (or any user device), can either provide aggregated data to the requesting device or individual user data. For example, and with reference to FIG. 5, in the case of aggregated data, if a request for data concerning "all users in the 60001 postal code region that believe Trump should be impeached" is received, aggregated data for those users meeting the specific criteria (all users in the 60001 postal code that believe Trump should be impeached) is provided. Thus, aggregated results could be provided in response to the request, e.g., "60% of all users in the 60001 postal code region answer yes to 'Should Trump be impeached?'," or "Of the respondents that answered yes to "Should Trump be impeached?' 90% were affiliated with the Democratic party and 83% were female." Alternatively, user action data corresponding to individual records could be provided at block 318. For example, a request for data may ask for the age range and ethnicity for all respondents living in Washington state that answered yes to the query "Should Trump be impeached?" In this case, the requested data for each individual meeting these criteria could be reported.

As optionally illustrated in FIG. 3, processing may continue at step 320 where the data manager operates to prevent modifications of a user's data in the user action data store even when the device properly presents the required private key, i.e., in some instances, it may be desirable to temporarily prevent modifications of that data. For example, it may be desirable to prevent a user from responding to a query and then, after seeing how a majority has responded, going back and changing his/her response. As a further example, such prohibition may be effectively only for a period of time. Regardless of the rules establishing the prohibition, in all cases other than a permanent prohibition against modifications, processing may proceed to step 322 where it is determined whether a specific event has occurred, e.g., expiration of the period of time. When such event occurs, processing may continue at block 324 where the previously implemented prohibitions are now removed, thereby permitting modifications of data in the user action data store (once again assuming proper presentation of the necessary private key). Though the processing of blocks 320-324 is illustrated as occurring after the storage of data in the data store, it is understood that the assessment of whether a prohibition against modifications exists can be performed earlier in the processing illustrated in FIG. 3.

Figure 6:
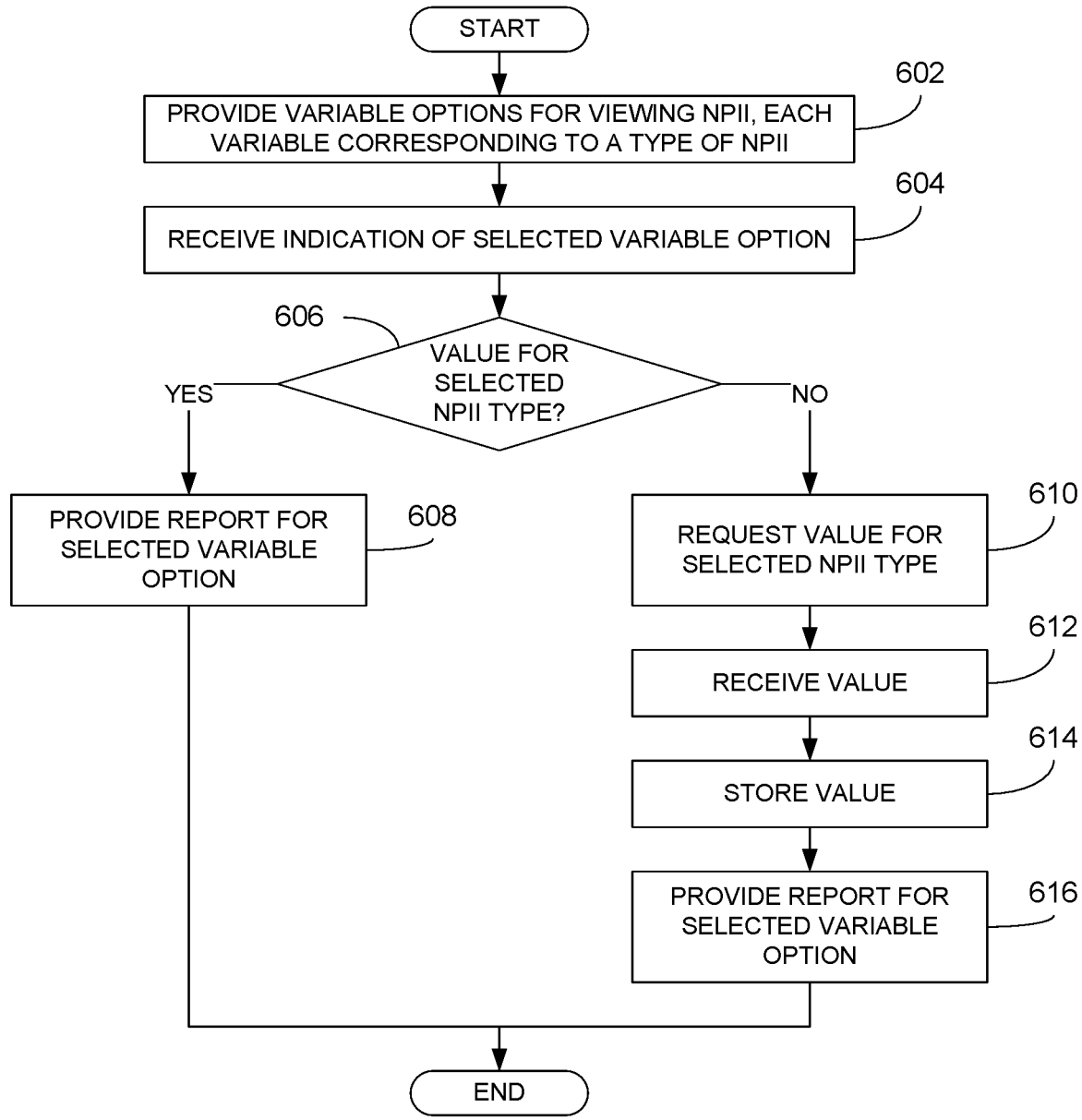
FIG. 6 is a flow chart illustrating processing performed in another embodiment in accordance with the teachings of the instant disclosure.

As noted above, there may be occurrences where a given user's data is incomplete. To address this, processing by the data manager in accordance with FIG. 6 may be employed to gather otherwise missing data for a given user. In particular, the processing of FIG. 6 occurs when a request for data is received from a given device. In an embodiment, such a request could be initiated by the device itself, as described above relative to FIG. 3. In the embodiment of FIG. 6, at block 602, the data manager provides variable options for viewing report based on the data in the user action data store to the device (through, for example, the provision of suitable graphical user interface). Each of the variable options preferably corresponds to a type of NPII data in the user action data store. The provision of the variable options could be done in response to a specific action previously taken by a user of the device, e.g., after responding to a survey query, the data manager could provide an interface to the device asking the user whether he/she would like to see the survey results according to the various types of NPII data included in the user action data store, e.g., by gender, political affiliation, political district, etc.

Thereafter, at block 604, the data manager receives an indication of a selected variable option from the device and, at block 606, determines whether data in the user action data store corresponding to the private key provided by the device includes a value for the type of data corresponding to the selected variable option. For example, and with reference to FIG. 5, if a device, having previously provided the private key for Ann Able, provides a selected variable option corresponding to ethnicity in order to view results by ethnicity, the data manager can determine that Ann Ables's data does include a value for the ethnicity data field in the user action data store 504. Conversely, in the case of Bob Baker in this same scenario, the data manager can determine that Bob Baker's data does not include a value for the ethnicity data field in the user action data store 504.

When it is determined that the data field in question does include a value, processing continues at block 608 where a report of data based on the selected variable option is provided by the data manager back to the device. Alternatively, when it is determined that the data field in question does not include a value, processing continues at block 610, where the data manager causes a request to be sent to the device, which request asks the device (user) to provide a value for the type of data corresponding to the selected variable option. Thereafter, at block 612, the data manager receives the requested value and stores it in the user action data store (as described above) at block 614. Having thus obtained the missing value, processing continues at block 616 where the data manager provides the requested report of data back to the device. Though not illustrated in FIG. 6, if the device fails to provide the requested value in response to the request at block 610, the data manager may decline to provide the requested data to the device.

The technique illustrated in FIG. 6 could be refined such that the data manager only provides variable options for viewing data that correspond to types of data known for the particular user to be lacking a corresponding value. In this way, the data manager is able to more directly cause missing data to be gathered. Further still, the request for a value of a given data type need not be premised on whether a value corresponding to the user already exists in the data store. For example, it may be desirable to make such a request even when such a value already exists, as in the case where it is desired to update an already existing value.

While particular preferred embodiments have been shown and described, those skilled in the art will appreciate that changes and modifications may be made without departing from the instant teachings. It is therefore contemplated that any and all modifications, variations or equivalents of the above-described teachings fall within the scope of the basic underlying principles disclosed above and claimed herein.

What is claimed is:

1. In a communication system comprising a plurality of devices operatively connected to a communication network, a method for ensuring user actions cannot be connected to personally identifiable information about a user, the method comprising:

receiving, by a data manager from at least one device of the plurality of devices via the communication network, user profile data, comprising personally identifiable information (PII) and non-personally identifiable information (NPII) about the user;

receiving, by the data manager from the at least one device via the communications network, user action data regarding an action the user has taken;

receiving, by the data manager from the at least one device via the communication network, a private key;

storing, by the data manager, the user profile data in a user profile data store; and storing, by the data manager, user action data and NPII user profile data in a user action data store based on the private key, where data in the user action data store is not linked to an identity of the user or any user data in the user profile data store, and where no PII user data is stored in the user action data store.

2. The method of claim 1, wherein storing data in the user action data store further comprises:

providing a user action data store access key based on a first one-way transformation of the private key, wherein knowledge of the user action data store access key is insufficient to derive the private key, and wherein data in the user action data store about the user is updated via the user action data store access key.

3. The method of claim 2, wherein storing data in the user profile data store further comprises:

providing a user profile data store access key based on a second one-way transformation of the private key, wherein knowledge of the user profile data store access key is insufficient to derive the private key and where the first one-way transformation and the second one-way transformation are different; and storing data in the user profile data store based on the user profile data store access key, wherein the user action data store is separate from the user profile data store and wherein data in the user action data store is not linked to the user profile data store.

4. The method of claim 2, the method further comprising, by the data manager:

transforming at least a portion of the PII user profile data into new NPII user profile data;

storing the new NPII user profile data in the user action data store based on the user action data store access key; and optionally storing the new NPII user profile data in the user profile data store.

5. The method of claim 1, the method further comprising, by the data manager:

authenticating at least a portion of either the user profile data or the user action data.

6. The method of claim 1, the method further comprising, by the data manager:

providing, to the at least one device via the communication network, variable options for viewing reports based on data in the user action data store, each of the variable options corresponding to a type of data in the user action data store;

receiving, from the at least one device via the communication network, an indication of a selected variable option; and confirming that the data stored in the user action data store based on the private key includes a value for the type of data corresponding to the selected variable option.

7. The method of claim 6, further comprising, by the data manager:

when the data stored in the user action data store based on the private key does include a value for the type of data corresponding to the selected variable option, providing, to the at least one device via the communication network, a report according to the selected variable option.

8. The method of claim 6, further comprising, by the data manager:

when the data stored in the user action data store based on the private key does not include a value for the type of data corresponding to the selected variable option:

sending, to the at least one device via the communication network, a request to provide a value for the type of data corresponding to the selected variable option;

receiving, from the at least one device via the communication network, the information concerning the value for the type of data corresponding to the selected variable option;

storing the information as the type of data corresponding to the selected variable option in the user action data store; and providing, to the at least one user device via the communication network, a report according to the selected variable option.

9. The method of claim 1, further comprising, by the data manager:

maintaining a historical record of all changes to the user profile data store and the user action data store.

10. The method of claim 1, wherein storing the user profile data in either the user profile data store or the user action data store further comprises storing the data locally on the at least one device.

11. The method of claim 1, wherein storing the user profile data in either the user profile data store of the user action data store further comprises storing the data on a third-party server.

12. The method of claim 1, further comprising, by the data manager:

limiting access to the user actions stored in the user action data store based on the private key to those devices of the plurality of devices that present the private key.

13. The method of claim 1, further comprising, by the data manager:

receiving a request from the at least one device for data from the user action data store; and providing data from the user action data store to the at least one device.

14. The method of claim 1, further comprising, by the data manager:

preventing modification to the user action data stored in the user action data store based on the private key by those devices of the plurality of devices that present the private key; and following occurrence of an event, permitting modification to the user action data stored in the user action data store based on the private key by those devices of the plurality of devices that present the private key.

15. An apparatus operatively connected to a communication network along with a plurality of devices, the apparatus for use in ensuring non-personally identifiable information about a user cannot be connected to personally identifiable information about the user, the apparatus comprising:

at least one processor; and machine readable storage, operatively connected to the at least one processor and having stored thereon instructions that, when executed by the at least processor cause the at least one processor to:

receive, from at least one device of the plurality of devices via the communication network, user profile data, comprising personally identifiable information (PII), and non-personally identifiable information (NPII) about the user;

receive, from the at least one device via the communication network, user action data regarding an action the user has taken;

receive, from the at least one device via the communication network, a private key;

store the user profile data in a user profile data store; and store the user action data and NPII user profile data in a user action data store based on the private key, where data in the user action data store is not linked to an identity of the user or any user data in the user profile data store, and where no PII user data is stored in the user action data store.

16. The apparatus of claim 15, wherein those instructions that cause the at least one processor to store data in the user action data store are further operative to cause the at least one processor to:

provide a user action data store access key based on a first one-way transformation of the private key, wherein knowledge of the user action data store access key is insufficient to derive the private key, and wherein data in the user action data store about the user is updated via the user action data store access key.

17. The apparatus of claim 16, wherein those instructions that cause the at least one processor to store data in the user profile data store are further operative to cause the at least one processor to:

provide a user profile data store access key based on a second one-way transformation of the private key, wherein knowledge of the user profile data store access key is insufficient to derive the private key and where the first one-way transformation and the second one-way transformation are different; and store data in the user profile data store based on the user profile data store access key, wherein the user action data store is separate from the user profile data store and wherein data in the user action data store is not linked to the user profile data store.

18. The apparatus of claim 16, the machine readable storage further comprising instructions that, when executed by the at least one processor, cause the at least one processor to:

transform at least a portion of the PII user profile data into new NPII user profile data;

store the new NPII user profile data in the user action data store based on the user action data store access key; and optionally store the new NPII user profile data in the user profile data store.

19. The apparatus of claim 15, the machine readable storage further comprising instructions that, when executed by the at least one processor, cause the at least one processor to:

authenticate at least a portion of either the user profile data or the user action data.

20. The apparatus of claim 15, the machine readable storage further comprising instructions that, when executed by the at least one processor, cause the at least one processor to:

provide, to the at least one device via the communication network, variable options for viewing reports based on data in the user action data store, each of the variable options corresponding to a type of data in the user action data store;

receive, from the at least one device via the communication network, an indication of a selected variable option; and confirm that the data stored in the user action data store based on the private key includes a value for the type of data corresponding to the selected variable option.

21. The apparatus of claim 20, the machine readable storage further comprising instructions that, when executed by the at least one processor, cause the at least one processor to:

when the data stored in the user action data store based on the private key does include a value for the type of data corresponding to the selected variable option, provide, to the at least one device via the communication network, a report according to the selected variable option.

22. The apparatus of claim 20, the machine readable storage further comprising instructions that, when executed by the at least one processor, cause the at least one processor to:

when the data stored in the user action data store based on the private key does not include a value for the type of data corresponding to the selected variable option:

send, to the at least one device via the communication network, a request to provide a value for the type of data corresponding to the selected variable option;

receive, from the at least one device via the communication network, the information concerning the value for the type of data corresponding to the selected variable option;

store the information as the type of data corresponding to the selected variable option in the user action data store; and provide, to the at least one device via the communication network, a report according to the selected variable option.

23. The apparatus of claim 15, the machine readable storage further comprising instructions that, when executed by the at least one processor, cause the at least one processor to:

maintain a historical record of all changes to the user profile data store and the user action data store.

24. The apparatus of claim 15, wherein those instructions that cause the at least one processor to store the user profile data in either the user profile data store or the user action data store are further operative to cause the at least one processor to store the data locally on the at least one device.

25. The apparatus of claim 15, wherein those instructions that cause the at least one processor to store the user profile data in either the user profile data store or the user action data store are further operative to cause the at least one processor to store the data on a third-party server.

26. The apparatus of claim 15, the machine readable storage further comprising instructions that, when executed by the at least one processor, cause the at least one processor to:

limit access to the user actions stored in the user action data store based on the private key to those devices of the plurality of devices that present the private key.

27. The apparatus of claim 15, the machine readable storage further comprising instructions that, when executed by the at least one processor, cause the at least one processor to:

receive a query from the at least one device for data from the user action data store; and provide data from the user action data store to the at least one device.

28. The apparatus of claim 15, the machine readable storage further comprising instructions that, when executed by the at least one processor, cause the at least one processor to:
- prevent modification to the user action data stored in the user action data store based on the private key by those devices of the plurality of devices that present the private key; and
- following occurrence of an event, permit modification to the user action data stored in the user action data store based on the private key by those devices of the plurality of devices that present the private key.

\* \* \* \* \*